United States Patent [19]
Walker

[11] Patent Number: 5,385,038
[45] Date of Patent: Jan. 31, 1995

[54] VEHICLE WHEEL CLAMP

[75] Inventor: James A. Walker, Stockton on Tees, England

[73] Assignee: John A. Malabre, New York, N.Y.

[21] Appl. No.: 73,935

[22] Filed: Jun. 8, 1993

[30] Foreign Application Priority Data

Jun. 18, 1992 [GB] United Kingdom ............... 9212901

[51] Int. Cl.6 .................... E05B 73/00; B62H 5/14
[52] U.S. Cl. ................................... 70/14; 70/18; 70/226
[58] Field of Search .............. 70/14, 18, 19, 225, 70/226, 259

[56] References Cited

U.S. PATENT DOCUMENTS

| | | | |
|---|---|---|---|
| 3,537,548 | 11/1970 | Jeppesen | 70/18 X |
| 3,828,590 | 8/1974 | Thiebault | 70/19 |
| 3,845,643 | 11/1974 | Barrett | 70/226 X |
| 3,868,837 | 3/1975 | Quimby | 70/18 X |
| 4,441,586 | 4/1984 | Bernier | 70/19 X |
| 4,649,724 | 3/1987 | Raine | 70/226 |
| 4,723,426 | 2/1988 | Beaudoin | 70/14 |
| 4,819,462 | 4/1989 | Apsell | 70/14 |
| 4,833,442 | 5/1989 | Von Heck | 70/226 X |
| 4,913,265 | 4/1990 | Richards | 70/226 X |
| 5,134,868 | 8/1992 | Bethards | 70/18 |

FOREIGN PATENT DOCUMENTS

| | | | |
|---|---|---|---|
| 2112725 | 7/1983 | United Kingdom | 70/226 |
| 2179607 | 3/1987 | United Kingdom . | |
| 2180806 | 4/1987 | United Kingdom . | |
| WO86/05150 | 9/1986 | WIPO . | |

Primary Examiner—Peter M. Cuomo
Assistant Examiner—Suzanne L. Dino
Attorney, Agent, or Firm—Leo Zucker

[57] ABSTRACT

A wheel clamp assembly to be applied on a road wheel of a vehicle to prevent unauthorized operation of the vehicle. The assembly includes a first elongate arm member and a catch member at one end of the first arm member projecting transversely of the first arm member. The first arm member and a second elongate arm member are each joined at their bottom ends to an elongate body member. The body member supports the arm members in spaced apart relationship so that the width of the road wheel can be accommodated between the arm members. The second arm member is movable relative to the first arm member between an inoperative position spaced from the first arm member an amount sufficient to permit the catch member to be located into and out of the wheel well opening, and an operative position wherein the second arm member is substantially parallel to the first arm member and extends transversely of the front face of the wheel. A key-operated locking mechanism retains the second arm member in the operative position.

12 Claims, 3 Drawing Sheets

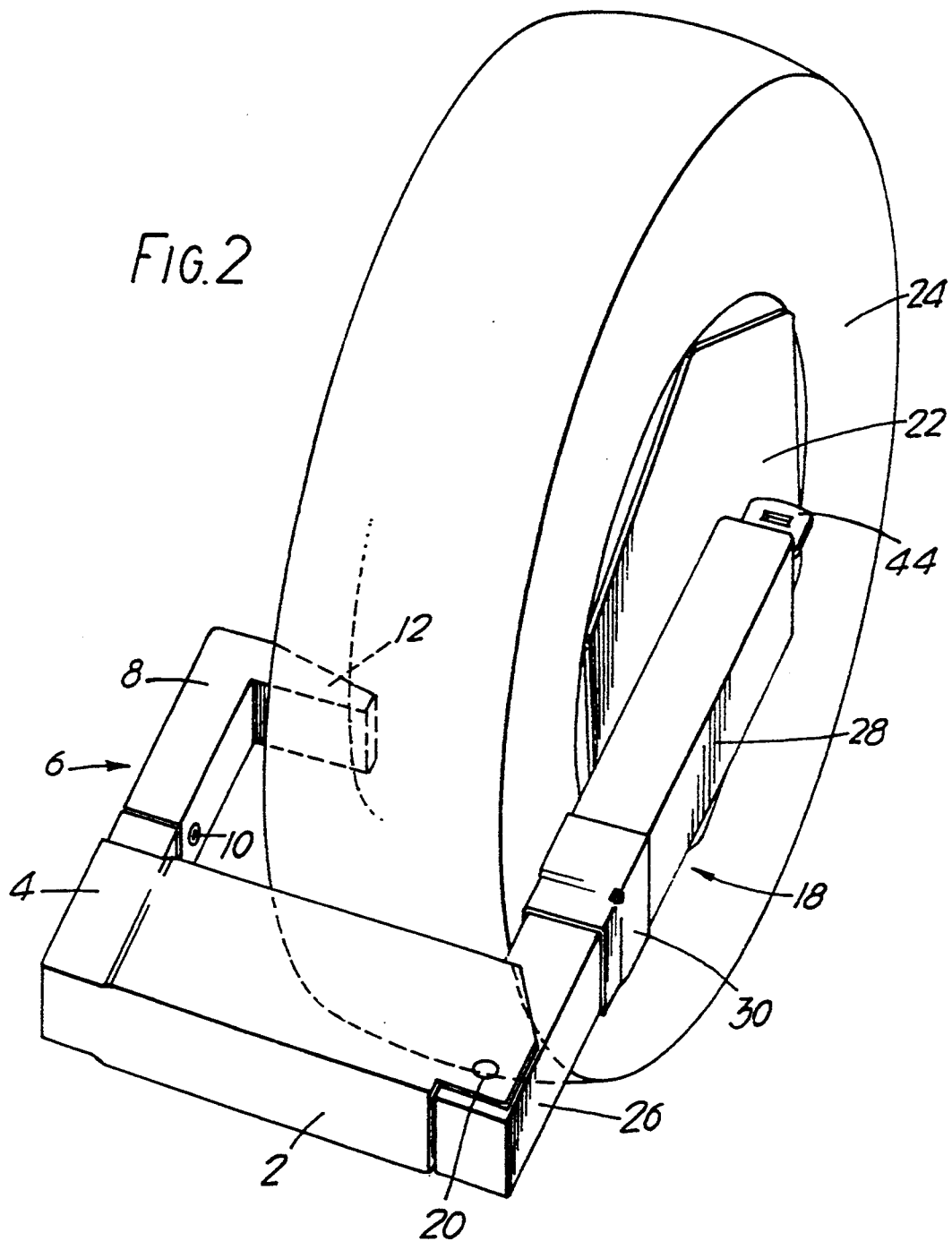

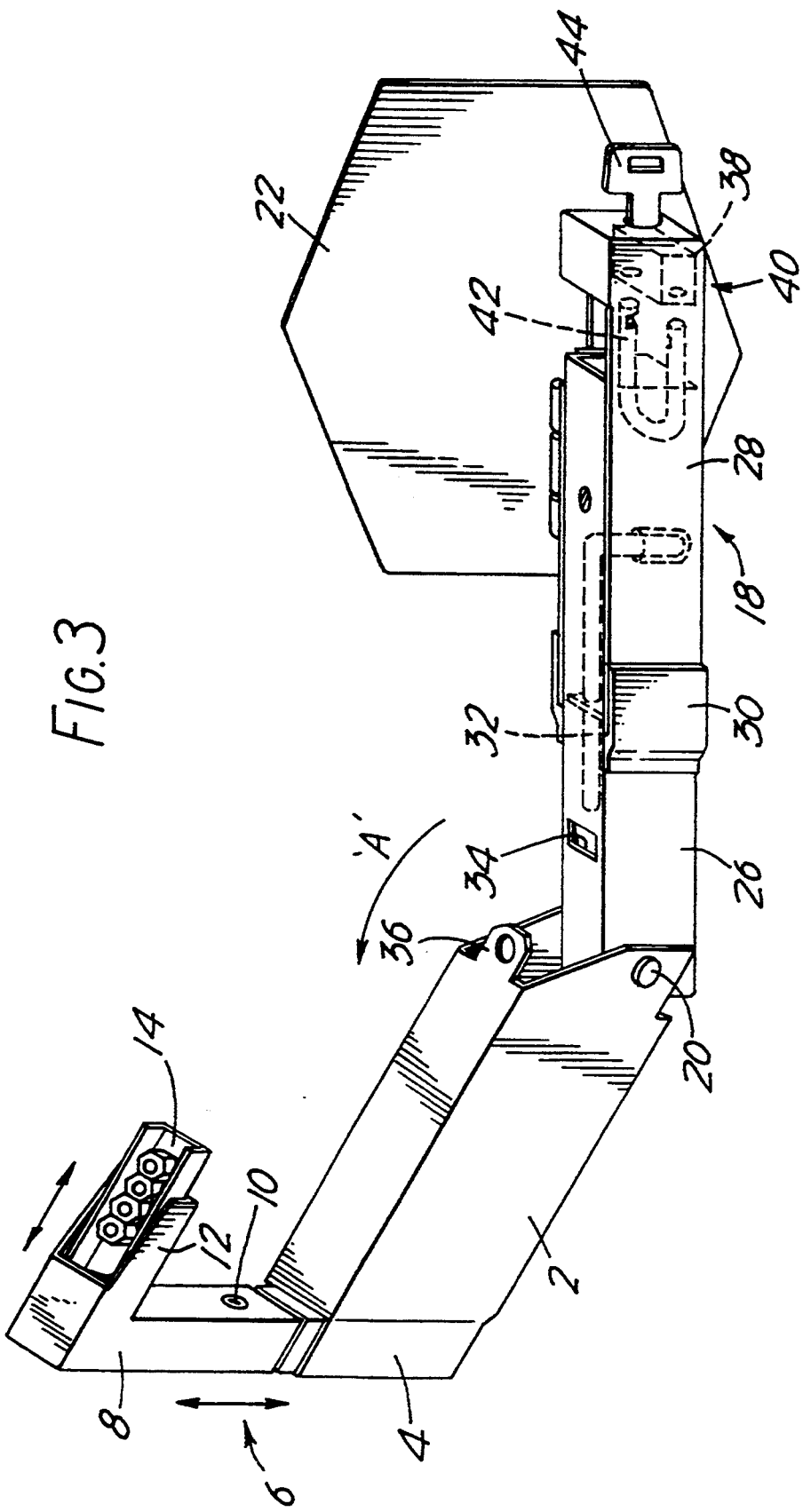

VEHICLE WHEEL CLAMP

BACKGROUND OF THE INVENTION

1. Field of the Invention

The present invention relates generally to vehicle wheel clamps for preventing unauthorized operation of parked vehicles, and more particularly to a wheel clamp assembly that can be locked about part of a road wheel of a motor vehicle to prevent unauthorized use of the vehicle, wherein the clamp is foldable for ease of storage in, e.g., the vehicle trunk space.

2. Description of the Known Art

It is established practice for parking enforcement authorities such as the police to immobilize illegally-parked vehicles by applying clamps about the wheels of such vehicles. Wheel clamps used in such situations are, however, invariably of a relatively bulky construction, and are time-consuming to fit in position. Furthermore many of the known clamps are attached diametrically across the entire wheel and the associated tire. Consequently, unauthorized removal can be effected relatively simply by deflating the tire and maneuvering the clamp off from the wheel.

Because the theft of motor vehicles has become an ongoing problem, numerous security devices are now available for attachment to motor vehicles, to prevent or deter unauthorized operation or removal of the vehicle. For example, alarm systems which emit a loud sound upon an unauthorized entry into a vehicle are particularly popular, but they can be readily disabled by a thief having knowledge of the systems. Additionally, there is an increasing tendency for activated alarm sounds to be ignored by the public because of a large number of false soundings that are known to occur. Clearly, this public attitude toward conventional car alarms plays into the hands of a potential thief.

Internal locking mechanisms applied to a vehicle steering wheel, control pedals, gear lever, hand brake and the like are also popular, but do not prevent a determined thief from entering the vehicle. Once inside, he or she can readily hacksaw through or otherwise remove the locking mechanism without persons nearby becoming aware of what is going on inside the vehicle.

On the other hand, wheel clamps provide an excellent visual deterrent to a potential thief, and any attempt at unauthorized removal of the clamp would be immediately apparent to passers-by. Consequently wheel clamps are becoming more popular for use by private motorists as a means to protect their vehicles.

U.S. Pat. No. 4,723,426 (Feb. 9, 1988), discloses a wheel clamp attachment comprised of two hinged members adapted to engage inner and outer faces of a wheel rim. A bolt extends in both members and draws them toward one another to engage the wheel rim. U.S. Pat. Nos. 3,828,590 (Aug. 13, 1974) and 4,833,442 (May 23, 1989) show wheel clamps or immobilizers having a pair of jaws that extend radially about the circumference of a tire on a vehicle wheel rim and engage the rim at a point on its outer circumference.

As mentioned, however, conventional wheel clamps suffer from various disadvantages which make them less than ideal for regular private use. Their bulky nature makes them inconvenient to store in the trunk of a vehicle, and the time needed to install and remove the clamp can discourage the vehicle owner from using the clamp, particularly in inclement weather. Also, as mentioned, it is possible for a thief to effect unauthorized removal of many conventional clamps merely by deflating the tire of the clamped wheel. It would, therefore, be desirable to make available a clamp for the road wheel of a vehicle, having a more compact construction and capable of being more easily installed than the conventional clamps, and which is less prone to unauthorized removal than the known clamps.

SUMMARY OF THE INVENTION

According to the invention, a wheel clamp for attachment to a vehicle road wheel having a circumferential rim, a front face and a well rearwardly of the front face, comprises first and second arm members laterally spaced apart to receive therebetween the width of said wheel, a catch member projecting from the first arm member toward the second arm member, said second arm member being movable relative to the first arm member between an inoperative position spaced from the first arm member such as to permit location of the catch member into and out of the well, and an operative position lying in a plane substantially parallel with that of the first arm member and extending transversely of the front face of the wheel, and selectively releasable locking means for retaining said second arm member in its operative position, the arrangement being such that, with the second arm member in its inoperative position, the clamp is located on the wheel with the catch member engaging the inner rim of the wheel and projecting inwardly of the well in the wheel, the second arm member is moved into its operative position extending transversely of the front face of the wheel, and the locking means are actuated to retain the second arm member in its operative position.

It will thus be appreciated that the present clamp is of relatively simple construction and can be secured to a wheel very quickly to react axially of the wheel, between opposite faces of the wheel, so that deflating the tire will in no way facilitate removal of the clamp from the wheel. Removal of the clamp can only be achieved by releasing the locking means and swinging the second arm back to its inoperative position.

The clamp includes a body member and the first and second arm members extend from opposed ends of the body member. In the operative position of the second arm member, it is preferred that the first and the second arm members extend substantially parallel with one another.

A plate member is mounted on the free end of the second arm member, said plate member being movable relative to the second arm member between a stored position defining a plane parallel with a plane containing the first and the second arm members, and an operative position overlying or flush with the front face of the wheel.

In a preferred embodiment of the invention, the plate member is pivotally mounted to the second arm member about a pivot axis extending longitudinally of the second arm member.

In an alternative embodiment, a plate member is removably mounted on the free end of the second arm member in a position which, in use, overlies the front face of the wheel.

Preferably, the second arm member pivots relative to the body member about an axis extending perpendicular to a plane containing the first and second arm members, the locking means acting between the second arm member and the body member.

The locking means may comprise a bolt member movable axially of the second arm member into and out of operative engagement with a retaining member integral with the body member, and a key-operated lock for retaining the bolt member in engagement with the retaining member.

The length of the first arm member may be adjustable to accommodate different radial widths of various tires; the length of the catch member may be adjustable to accommodate different axial sizes and configurations of the wheel rim; and the length of the body member may be adjustable to accommodate different overall axial widths of various tires.

For a better understanding of the present invention, reference is made to the following description taken in conjunction with the accompanying drawing, and the scope of the invention will be pointed out in the appended claims.

BRIEF DESCRIPTION OF THE DRAWING

In the drawing:

FIG. 2 is a view of the wheel clamp of FIG. 1 in an operative position on a wheel, and FIG. 3 is a view of the clamp of FIG. 1 with the second arm member in an inoperative position, and showing details of a locking mechanism.

DETAILED DESCRIPTION OF THE INVENTION

Figure 1:
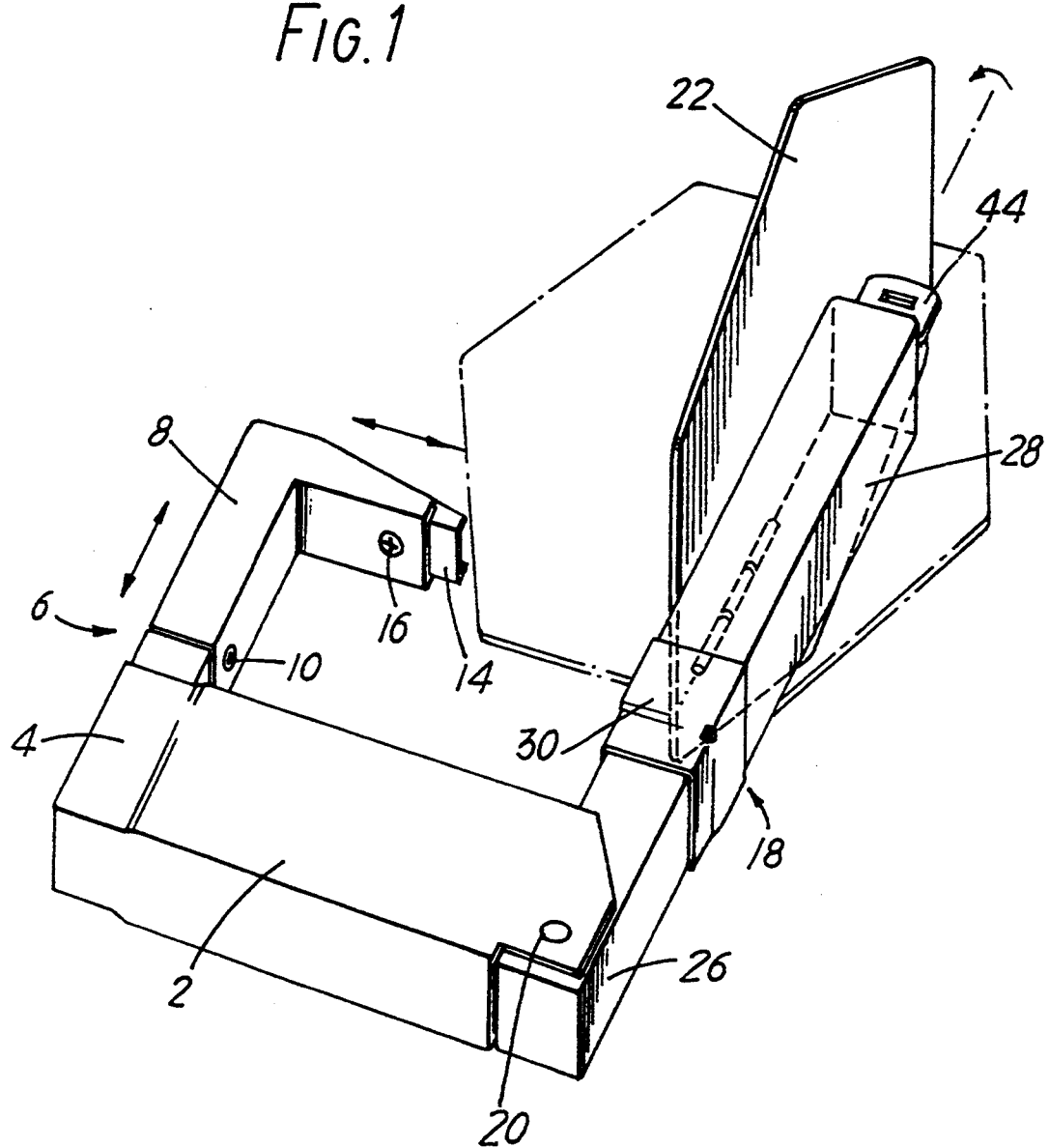
FIG. 1 is a perspective view of a wheel clamp having first and second arm members according to the invention, with the second arm member in an operative position.

A vehicle wheel clamp according to the present invention includes a steel transverse body member 2 having a hollow rectangular section. A lower portion 4 of a first box-section arm member 6 is secured to one end of the body member 2, so that the arm member 6 extends upwardly from the body member 2 as shown at the left side of FIG. 1.

An upper portion 8 of the arm member 6 is mounted in telescoping fashion on the lower portion 4 of the arm member 6. The axial position of the upper portion 8 can be varied relative to the lower portion 4 so that the overall length of the arm member 6 can be altered. The arm portions 4,8 are secured together at a desired position by means of a screw 10 that engages the two portions.

The free end of the upper portion 8 of the arm member 6 includes a catch member 12 projecting at right angles to the arm member 6 and parallel with the length of the body member 2. A slidable tongue portion 14 is mounted for sliding movement on the catch member 12. Tongue portion 14 can be adjustably located on the catch member 12 to increase the length of the member 12 by varying amounts as may be desired. The tongue portion 14 is secured to the catch member 12 at a desired position by a screw 16 that engages the two parts.

A second arm member 18 has one end pivotally mounted to the other end of the body member 2. Arm member 18 pivots about a pivot pin 20 on the body member 2 between an operative position shown in FIGS. 1 and 2 extending parallel with and spaced from the arm member 6, and an inoperative or open position extending outwardly in the axial direction of the body member 2 to form an extension of the body member as seen in FIG. 3.

A plate member 22 of generally hexagonal shape is mounted on an upper end portion of the arm member 18 and pivots about a hinge axis extending along a longitudinal edge of the arm member 18, between a stored position shown in dotted lines in FIG. 1 and in full lines in FIG. 3, and an operative position shown in full lines in FIGS. 1 and 2 displaced through 90° from the stored position.

The present wheel clamp can be attached to a road wheel of a motor vehicle, caravan, trailer or the like to prevent movement of the vehicle.

More particularly, the arm member 18 is pivoted to its inoperative position as shown in FIG. 3. The arm member 6 is then maneuvered behind the wheel 24 (see FIG. 2) to be clamped so that the catch member 12 projects into the well of the wheel and engages the inner rim of the wheel. In this position of the clamp, the body member 2 abuts the outer circumferential wall of the wheel tire and extends across the axial width of the tire with the arm member 6 encompassing the inner wall of the tire.

With the plate member 22 in its operative position, the arm member 18 is pivoted about the pivot 20 to the position shown in FIG. 2 in which the plate member 22 abuts the front face of the wheel 24 and the arm member 18 extends transversely of the front face of the wheel and parallel with the rear arm member 6. The arm member 18 is then locked in its operative position at which the clamp is secured to the wheel and cannot be removed.

A mechanism for locking the present clamp to the wheel 24 can take any one of a number of different forms. A currently preferred arrangement is shown in FIG. 3. The arm member 18 includes a hollow box-section portion 26 the lower end of which is pivotally mounted to the body member 2, about the pivot pin 20. A channel section portion 28 forms an upper region of the portion 26 and is slidable in the axial direction. An open-ended collar 30 is welded to the portion 26 and receives a lower end of the channel section portion 28. The portion 28 is guided by the collar 30 during axial movement of the portion 28 relative to the portion 26.

An elongate bolt 32 is located in axial alignment within the box-section portion 26 to be movable with the channel section portion 28. The box section portion 26 has an aperture 34 formed in its inside wall adjacent the lower end of the bolt 32, and the other end of the body member 2 is provided with an axially projecting flange 36 having an aperture.

The body 38 of a padlock 40 is fixedly mounted within the upper end region of the channel section portion 28. A shackle 42 of the padlock 40 is welded to an inner wall of the box section portion 26 to project from the free end of the portion 26. The padlock 40 is operated by means of a key 44 that engages the body 38 of the padlock 40 through an opening in the end wall of the portion 28.

The described locking mechanism operates as follows. With the second arm member 18 in its inoperative position and with the padlock 40 unlocked as shown in FIG. 3, the channel section portion 28 is displaced axially outwardly along the portion 26 to the right as viewed in FIG. 3. The body 38 of the padlock 40 is thus displaced from the shackle 42, the extent of axial displacement of the portion 28 relative to the portion 26 being determined by the available free relative movement between the body 38 and the shackle 42 of the padlock 40. In this position of the arm member 18, the free end of the bolt 32 is located axially ahead or outwardly of the aperture 34 as seen in FIG. 3.

The operative position of the arm member 18 is achieved by pivoting the arm member 18 in the direction of arrow 'A' so that the flange 36 with its aperture is received within the aperture 34 as the portion 26 of the arm member 18 abuts the other end of the body member 2.

The channel section portion 28, together with the body 38 of the padlock 40 and the bolt 32, are then slid axially inwardly of the portion 26 so that the free end of the bolt 32 projects through the aperture in the flange 36, and the body 38 and shackle 42 of the padlock snap into locking engagement with one another.

Thus, the cooperation between the bolt 32 and the flange 36 prevents any pivoting movement of the arm member 18 relative to the body member 2, while relative axial movement between the portions 26, 28 of the arm member 28 is prevented by the padlock 40.

In order to release the clamp, the key 44 is turned to release the shackle 42 from the body 38 of the padlock 40, and the channel section portion 28, together with the body 38 of the padlock 40 and the bolt 32, are slid axially outwardly of the portion 26 so that the bolt 32 is disengaged from the flange 36, and the arm portion 28 can be pivoted outwardly of the body member 2 about the pivot 20.

It will be appreciated that the present vehicle clamp as described herein is of relatively simple construction and can easily be secured to a wheel merely by maneuvering the arm member 6 with the attached catch member 12 of the open clamp rearwardly of the wheel, closing the arm member 18 with the attached plate 22 onto the front face of the wheel, and sliding down the portion 28 of the arm member 18 into its axially innermost position at which the padlock 40 is locked.

Removal of the clamp requires rotation of the key 44 the padlock and subsequent reversal of the above procedure. The fact that the clamp effectively grips the front and rear faces or walls of the wheel between the first and second arm members — i.e., axial clamping of the wheel — means that removal of the clamp cannot be effected by deflating or letting down the tire as is the case with the known diametrical fitting clamps referred to above.

The precise construction of the present vehicle clamp can differ from that described and illustrated without departing from the scope of the invention. In particular, the means for locking the arm member 18 in its operative position could take any one of a variety of different forms, while the plate 22, if present, could be other than hexagonal in shape.

The use of a plate such as the plate 22 has the advantage of covering the wheel nuts of the wheel 24 to prevent unauthorized removal of the wheel, while it is preferred that the surface of the plate 22 abutting the wheel have a resilient pad on its surface to prevent any damage to the wheel.

The pivotal mounting of the plate 22 to the arm member 18 enables the plate to conform to the storage position shown in dotted lines in FIG. 1 and the clamp to be extremely compact for storage purposes, for example, in the trunk of a car.

In a further variation from the illustrated clamp, the plate 22 is removably mounted on the second arm member 18 so that any one of a plurality of different sized plates may be located on the clamp dependent upon the size of the wheel being clamped. Once the second arm member 18 is in its operative position, the plate 22 cannot then be removed from the clamp.

Although described as being pivotally mounted on the body member 2, the second arm member 18 may be otherwise movable relative to the body member 2 to provide the gap necessary between the first and second arm members 6,18 to enable the clamp to be applied to and removed from the wheel 24. For example, the arm member 18 may be mounted on the body member 2 to be slidable in a direction along the length of the body member 2 — i.e., axially of the wheel 24 — or up and down relative to the body member — i.e., radially of the wheel 24.

In a variation from the illustrated clamp, the length of the body member 2 is variable, for example, by being of a telescopic construction under the control of a worm-screw. Thus, wheels of differing widths can more readily be accommodated. It will also be appreciated that adjustability in the lengths of the arm member 6 and the catch member 12 enables the clamp to be used with different depths of various tires and depths of various wheel rims.

While the foregoing description represents a preferred embodiment of the invention, it will be obvious to those skilled in the art that various changes and modifications may be made, without departing from the true spirit and scope of the invention as pointed out in the following claims.

What is claimed is:

1. A wheel clamp assembly to be applied on a road wheel of a vehicle to prevent unauthorized operation of the vehicle, the wheel including a circular rim of a certain width in the axial direction of the rim, the rim defining a front face perpendicular to the rim axis and having an inner circumferential wall that forms a wheel well opening rearwardly of said front face, the wheel clamp assembly comprising:

a first elongate arm member;

a catch member at one end of said first arm member, the catch member projecting transversely of the first arm member;

a second elongate arm member and support means joined to bottom ends of the first and the second arm members for supporting the arm members in spaced apart relationship so that the width of said road wheel can be accommodated between said arm members;

mounting means for joining the bottom end of said second arm member to an end of said support means to enable the second arm member to be movable relative to the first arm member between an inoperative position spaced from the first arm member an amount sufficient to permit said catch member to be located into and out of said wheel well opening, and an operative position wherein the second arm member is substantially parallel to the first arm member and extends transversely of the front face of said wheel;

selectively releasable locking means for retaining the second arm member in said operative position;

a plate member mounted on said second arm member, the plate member being of sufficient size and shape to overlie substantially the front face of said wheel; and hinge means fixed to said plate member and to said second arm member, said hinge means having a hinge axis extending along a longitudinal edge of the second arm member so that the plate member can be swung relative to the second arm member about said hinge axis between a stored position wherein the plate member lies in a plane parallel with a plane including the first and the second arm members, and an operative position displaced about 90° from the stored position wherein the plate member overlies the front face of the vehicle wheel;

wherein the wheel clamp is applied to the wheel with said catch member engaging an inner rim of the wheel in the region of said wheel well opening, the catch member projects inwardly of said well opening, said second arm member moves into its operative position extending transversely of the front face of said wheel, and said locking means is actuated to retain the second arm member in said operative position.

2. A wheel clamp according to claim 1, wherein said support means comprises an elongate body member, and the first and the second arm members extend from opposite ends of said body member.

3. A wheel clamp according to claim 2, including pivot means for joining the second arm member to said body member for relative pivotal movement about an axis perpendicular to said plane including the first and the second arm members, and wherein said locking means includes means for coacting with the second arm member and said body member.

4. A wheel clamp according to claim 3, wherein said locking means comprises a bolt member mounted for movement axially of the second arm member into and out of engagement with a retaining member integral with said body member, and key-operated lock means in the vicinity of the free end of the second arm member for retaining the bolt member in engagement with said retaining member.

5. A wheel clamp according to claim 1, including means for adjusting the length of said catch member.

6. A wheel clamp according to claim 1, including means for adjusting the length of said first arm member.

7. A wheel clamp assembly to be applied on a road wheel of a vehicle to prevent unauthorized operation of the vehicle, the wheel including a circular rim of a certain width in the axial direction of the rim, the rim defining a front face perpendicular to the rim axis and having an inner circumferential wall that forms a wheel well opening rearwardly of said front face, the wheel clamp assembly comprising:

a first elongate arm member;

a catch member at one end of said first arm member, the catch member projecting transversely of the first arm member;

a second elongate arm member having a hollow section;

support means joined to bottom ends of the first and the second arm members, for supporting the arm members in spaced apart relationship so that the width of said road wheel can be accommodated between said arm members;

said support means including a flange part projecting toward the second arm member;

mounting means for joining the bottom end of said second arm member to an end of said support means to enable the second arm member to be movable relative to the first arm member between an inoperative position spaced from the first arm member an amount sufficient to permit said catch member to be located into and out of said wheel well opening, and an operative position wherein the second arm member is substantially parallel to the first arm member and extends transversely of the front face of said wheel, the second arm member having an aperture in its wall for receiving the flange part of said support means when in said operative position; and selectively releasable locking means for retaining the second arm member in said operative position;

said locking means comprising an elongate bolt member inside the second arm member, means inside the second arm member for mounting the bolt member for sliding movement in the axial direction of the second arm member, and key lock means on the second arm member for sliding and locking the bolt member in engagement with said flange part when the second arm member is in said operative position and said flange part projects through the aperture in the second arm member to engage said bolt member;

wherein the wheel clamp is applied to the wheel with said catch member engaging an inner rim of the wheel in the region of said wheel well opening, the catch member projects inwardly of said well opening, said second arm member moves into its operative position extending transversely of the front face of said wheel, and said locking means is actuated to retain the second arm member in said operative position.

8. A wheel clamp according to claim 7, wherein said support means comprises an elongate body member, and the first and the second arm members extend from opposite ends of said body member.

9. A wheel clamp according to claim 7, including a plate member mounted on a free end portion of said second arm member, the plate member being of sufficient size and shape to overlie substantially the front face of said wheel, and means for enabling the plate member to be swung relative to the second arm member between a stored position wherein the plate member lies in a plane parallel with a plane including the first and the second arm members, and an operative position wherein the plate member overlies the front face of said wheel.

10. A wheel clamp according to claim 9, wherein said enabling means includes hinge means having a pivot axis extending longitudinally of the second arm member, for mounting the plate member to the second arm member for relative pivotal movement between said stored position and said operative position.

11. A wheel clamp according to claim 7, including means for adjusting the length of said catch member.

12. A wheel clamp according to claim 7, including means for adjusting the length of said first arm member.

* * * * *